US012810130B2

(12) United States Patent
Hatta et al.

(10) Patent No.: US 12,810,130 B2
(45) Date of Patent: Nov. 24, 2026

(54) DATA PROCESSING DEVICE, DATA PROCESSING METHOD, AND DATA PROCESSING PROGRAM

(71) Applicant: NTT, Inc., Tokyo (JP)

(72) Inventors: Saki Hatta, Tokyo (JP); Hiroyuki Uzawa, Tokyo (JP); Shuhei Yoshida, Tokyo (JP); Daisuke Kobayashi, Tokyo (JP); Yuya Omori, Tokyo (JP); Ken Nakamura, Tokyo (JP); Koyo Nitta, Tokyo (JP)

(73) Assignee: NTT, Inc., Tokyo (JP)

( * ) Notice: Subject to any disclaimer, the term of this patent is extended or adjusted under 35 U.S.C. 154(b) by 753 days.

(21) Appl. No.: 18/269,528

(22) PCT Filed: Dec. 28, 2020

(86) PCT No.: PCT/JP2020/049249

§ 371 (c)(1),
(2) Date: Jun. 23, 2023

(87) PCT Pub. No.: WO2022/145016

PCT Pub. Date: Jul. 7, 2022

(65) Prior Publication Data

US 2024/0135155 A1 Apr. 25, 2024
US 2024/0232593 A9 Jul. 11, 2024

(51) Int. Cl.
*G06N 3/063* (2023.01)

(52) U.S. Cl.
CPC .................................... *G06N 3/063* (2013.01)

(58) Field of Classification Search
CPC ............................. G06N 3/063; G06N 3/0464
See application file for complete search history.

(56) References Cited

U.S. PATENT DOCUMENTS

| | | | | |
|---|---|---|---|---|
| 2020/0143232 | A1* | 5/2020 | Ito | G06N 3/047 |
| 2020/0387787 | A1* | 12/2020 | Yoda | G06N 3/0464 |
| 2022/0164411 | A1* | 5/2022 | Jain | G06F 17/15 |

OTHER PUBLICATIONS

Redmon et al. (2018) “YOLOv3: An Incremental Improvement” Apr. 8, 2018 [online] website: https://arxiv.org/abs/1804.02767.
Liu et al. (2016) “SSD: Single Shot MultiBox Detector” Dec. 29, 2016 [online] website: https://arxiv.org/pdf/1512.02325.pdf.

(Continued)

*Primary Examiner* — Alexey Shmatov
*Assistant Examiner* — Devika S Maharaj

(57) ABSTRACT

In a data processing device, a fixed-point position control unit determines, as first control. The fixed-point position control unit causes a detection calculation unit to perform calculation processing on processing target data at a processing point in time. The saturation rate control unit instructs, as second control to be repeated by the fixed-point position control unit, the fixed-point position control unit to move at least the fixed-point position as control to increase a lower limit saturation rate proportional to a magnitude of a counted lower limit counter value with respect to a result of the first control. The fixed-point position control unit performs, as the second control, a predetermined determination on the basis of the instruction from the saturation rate control unit and the metadata, determines the fixed-point position moved for each layer, and causes calculation processing to be performed.

8 Claims, 13 Drawing Sheets

(56) References Cited

OTHER PUBLICATIONS

Li et al. (2017) “Laius: An 8-Bit Fixed-Point CNN Hard ware Inference Engine” 2017 IEEE International Symposium on Parallel and Distributed Processing with Applications and 2017 IEEE International Conference on Ubiquitous Computing and Communications (ISPA/IUCC), Guangzhou, pp. 143-150, doi: 10.1109/ISPA/IUCC.2017.00030.

Hatta et al. (2020) “Dynamic Fixed-point Control Method for Object-detection AI Inference Hardware”, The Institute of Electronics, Information and Communication Engineers, Sep. 2020.

* cited by examiner

DATA PROCESSING DEVICE, DATA PROCESSING METHOD, AND DATA PROCESSING PROGRAM

CROSS-REFERENCE TO RELATED APPLICATIONS

This application is a U.S. National Stage Application filed under 35 U.S.C. § 371 claiming priority to International Patent Application No. PCT/JP2020/049249, filed on 28 Dec. 2020, the disclosure of which is hereby incorporated herein by reference in its entirety.

TECHNICAL FIELD

The present disclosure relates to a data processing device, a data processing method, and a data processing program.

BACKGROUND ART

Various data processing techniques using multilayer neural networks and deep learning have been developed. The application range of such techniques is expanding to various fields such as recognition and detection. For example, object detection is a technique of detecting metadata including positions (rectangular frames surrounding objects) and attributes (types of objects such as people or cars) of an object included in an input image and recognition accuracy of each object from the input image. For object detection, in recent years, there has been a technique of detecting metadata on the basis of a result of deep learning. For example, Non Patent Literature 1 discloses You Only Look Once (YOLO). Non Patent Literature 2 discloses a single shot multibox detector (SSD). Application of these techniques to an object detection system requiring real-time performance such as an automatic driving and monitoring camera has been studied.

From the viewpoint of network traffic load distribution and security protection, mounting an object detection device such as an automatic driving and monitoring camera on an edge of a network, that is, a terminal side, has also been studied. In order to mount the object detection device on the edge of the network, it is necessary to reduce the size and power consumption of the device.

In order to achieve size reduction and low power consumption, a configuration has been proposed in which object detection processing based on deep learning is implemented by hardware and a data bit width of all data handled by an arithmetic unit is reduced (see Non Patent Literature 3). Examples of the data include an input, an output (feature map), a weight (kernel), and a bias. In general, in a case where the deep learning inference processing is executed by software, all data used for a product-sum operation is treated as 32 bit floating point data. This is because a possible range of the value of each piece of data is wide, and the range is different for each image or for each layer such as a convolution layer constituting a convolutional neural network. In Non Patent Literature 3, it is reported that the effect of reducing the circuit scale and power can be obtained by determining the data bit width in each layer of the convolutional neural network in advance using statistical information and reducing the data bit width to 8 to 16 bits.

In addition, for these approaches, a method is disclosed in which each data width is uniformly set to n bits (n<32) of a fixed-point number, and a fixed-point position is dynamically controlled for each input image and for each layer (see Non Patent Literature 4).

CITATION LIST

Non Patent Literature

Non Patent Literature 1: Joseph Redmon et al., "YOLOv3: An Incremental Improvement", https://arxiv.org/abs/1804.02767

Non Patent Literature 2: Wei Liu et al., "SSD: Single Shot MultiBox Detector", https://arxiv.org/pdf/1512.02325.pdf Non Patent Literature 3: Zhisheng Li et al., "Laius: An 8-Bit Fixed-Point CNN Hard ware Inference Engine", 2017 IEEE International Symposium on Parallel and Distributed Processing with Applications and 2017 IEEE International Conference on Ubiquitous Computing and Communications (ISPA/IUCC), Guangzhou, 2017, pp. 143-150, doi: 10.1109/ISPA/IUCC.2017.00030.

Non Patent Literature 4: Saki Hatta, Hiroyuki Uzawa, Shuhei Yoshida, and Koyo Nitta, "Dynamic Fixed-point Control Method for Object-detection AI Inference Hardware", The Institute of Electronics, Information and Communication Engineers, September 2020.

SUMMARY OF INVENTION

Technical Problem

However, the method of dynamically controlling the fixed-point position has a configuration of performing calculations on all pixel values. In addition, even when the values of the feature maps having the same value are continuous, the calculation is always executed. Therefore, there is a problem that it is difficult to reduce power consumption.

The disclosed technique has been made in view of the above points, and an object thereof is to provide a data processing device, a data processing method, and a data processing program capable of reducing power consumption by skipping calculation that can be performed by increasing an equivalence rate of an output.

Solution to Problem

According to a first aspect of the present disclosure, there is provided a data processing device including: a fixed-point position control unit configured to set a fixed-point position of N-bit (N is a natural number of 2 or more) fixed-length data corresponding to each of a plurality of layers constituting a multilayer neural network, and set a fixed-point position of the fixed-length data; a detection calculation unit configured to perform calculation processing corresponding to each of the plurality of layers constituting the multilayer neural network for each of pieces of processing target data continuously input according to a processing algorithm of the multilayer neural network with respect to the N-bit fixed-length data in which the fixed-point position is set by the fixed-point position control unit, determine equivalence data that increases according to a saturation rate of the processing target data at a processing point in time in the calculation processing, skip second and subsequent calculation processing of the equivalence data, and detect metadata including the number of detected objects in the processing target data at the processing point in time, a frame surrounding the objects, an attribute, and recognition accuracy of the attribute in the calculation processing; a counter unit configured to count an upper limit counter value that is a number of times an upper limit value (a value of 1:00 for all bit strings) of a value range determined by the fixed-point position is exceeded and a lower limit counter value that is a number of times falling below a lower limit value (a value of 1:00 for only a least significant bit (LSB) among all bit strings) of the value range occurs in a process of the calculation processing for each layer of the detection calculation unit; and a saturation rate control unit and a recognition accuracy synthesis unit, in which the fixed-point position control unit determines, as first control, a fixed-point position moved for each layer such that the upper limit counter value falls within a range of a first threshold value and the lower limit counter value falls within a range of a second threshold value, and causes the detection calculation unit to perform calculation processing on the processing target data at the processing point in time, the saturation rate control unit instructs, as second control to be repeated by the fixed-point position control unit, the fixed-point position control unit to move at least the fixed-point position as control to increase a lower limit saturation rate proportional to a magnitude of the counted lower limit counter value with respect to a result of the first control, the fixed-point position control unit performs, as the second control, a predetermined determination based on the instruction from the saturation rate control unit and the metadata, determines the fixed-point position moved for each layer, and causes the detection calculation unit to perform calculation processing on the processing target data at the processing point in time, and the recognition accuracy synthesis unit replaces, as the second control, the recognition accuracy obtained by the calculation processing of the detection calculation unit with the stored recognition accuracy with higher accuracy.

According to a second aspect of the present disclosure, there is provided a data processing method causing a computer to execute processing including: setting a fixed-point position of N-bit (N is a natural number of 2 or more) fixed-length data corresponding to each of a plurality of layers constituting a multilayer neural network, and setting a fixed-point position of the fixed-length data; performing calculation processing corresponding to each of the plurality of layers constituting the multilayer neural network for each of pieces of processing target data continuously input according to a processing algorithm of the multilayer neural network with respect to the N-bit fixed-length data in which the fixed-point position is set, determining equivalence data that increases according to a saturation rate of the processing target data at a processing point in time in the calculation processing, skipping second and subsequent calculation processing of the equivalence data, and detecting metadata including the number of detected objects in the processing target data at the processing point in time, a frame surrounding the objects, an attribute, and recognition accuracy of the attribute in the calculation processing; counting an upper limit counter value that is a number of times an upper limit value of a value range determined by the fixed-point position is exceeded and a lower limit counter value that is a number of times falling below a lower limit value of the value range occurs in a process of the calculation processing for each layer; determining, as first control, a fixed-point position moved for each layer such that the upper limit counter value falls within a range of a first threshold value and the lower limit counter value falls within a range of a second threshold value, and performing calculation processing on the processing target data at the processing point in time; issuing, as second control to be repeated, an instruction to move at least the fixed-point position as control to increase a lower limit saturation rate proportional to a magnitude of the counted lower limit counter value with respect to a result of the first control; performing, as the second control, a predetermined determination based on the instruction and the metadata, determining the fixed-point position moved for each layer, and performing calculation processing on the processing target data at the processing point in time; and replacing, as the second control, the recognition accuracy obtained by the calculation processing with the stored recognition accuracy with higher accuracy.

Advantageous Effects of Invention

According to the disclosed technique, it is possible to reduce power consumption by skipping calculation that can be performed by increasing the equivalence rate of the output.

DESCRIPTION OF EMBODIMENTS

Figure 1:
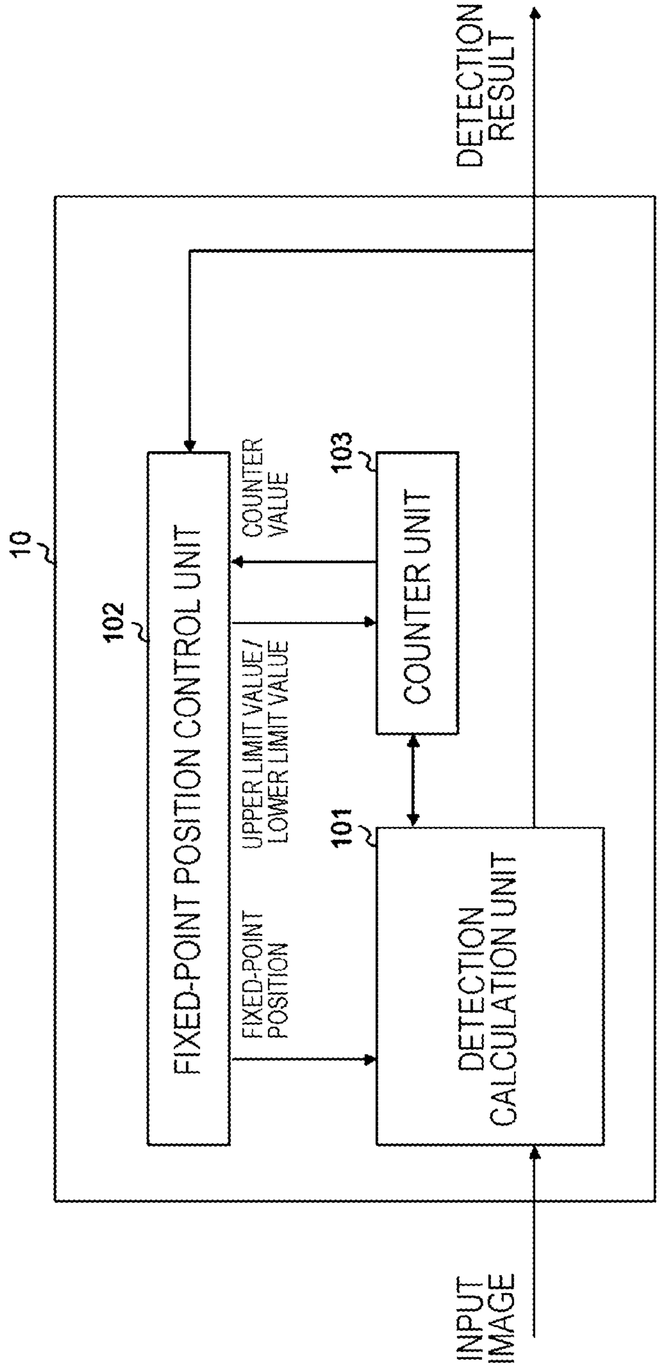
FIG. 1 is a diagram illustrating a configuration of an object detection device according to a reference example.

Hereinafter, examples of an embodiment of the disclosed technique will be described with reference to the drawings. In the drawings, the same or equivalent components and portions are denoted by the same reference signs. Further, dimensional ratios in the drawings are exaggerated for convenience of description and thus may be different from actual ratios.

First, before describing an embodiment of the present disclosure, a configuration and an operation of a reference example will be described for the technique of Non Patent Literature 4 which is a premise of the technique of the present disclosure.

[Reference Example]

In the reference example, an object detection device corresponding to a data processing device will be described as an example. The object detection device receives a series of a plurality of input images (hereinafter sometimes simply called images) continuously input from a video and performs processing. The object detection device is a device that performs object detection by detecting metadata including the number of detected objects included in the image, a frame surrounding the object, an attribute, and recognition accuracy of the attribute. Here, the position of the object is represented by coordinates of the center of the object in the image or a rectangular frame surrounding the object. In addition, the attribute is a type of an object such as a person or a car, and may be referred to as a category. Furthermore, the recognition accuracy is, for example, a probability that the detected object has a specific attribute. Note that a series of a plurality of input images (images) continuously input from the video is an example of "each of pieces of continuously input processing target data" of the technique of the present disclosure.

As illustrated in FIG. 1, the object detection device 10 according to the reference example includes a detection calculation unit 101, a fixed-point position control unit 102, and a counter unit 103. The detection calculation unit 101 is configured to perform calculation processing based on deep learning inference processing on the input image. The fixed-point position control unit 102 determines a position of the decimal point of fixed-length data (hereinafter simply referred to as a "fixed-point position") to be calculated in the detection calculation unit 101. "Counter unit" 103 is a general term for an upper limit counter and a lower limit counter. The counter unit 103 is configured to count, for each layer, the number of times the data exceeds the upper limit and the lower limit of the value range determined by the fixed-point position set by the fixed-point position control unit 102 in the process of the calculation processing by the detection calculation unit 101. The counter unit 103 counts the number of times the data exceeds the upper limit of the value range determined by the fixed-point position set by the fixed-point position control unit 102 and the number of times the data exceeds the upper limit.

As hardware, the detection calculation unit 101 is a calculation processing circuit configured to perform calculation processing corresponding to each of a plurality of layers constituting the multilayer neural network according to a processing algorithm of the multilayer neural network. Typically, a convolutional neural network (CNN) is used for the processing by the multilayer neural network in the detection calculation unit 101.

Figure 2:
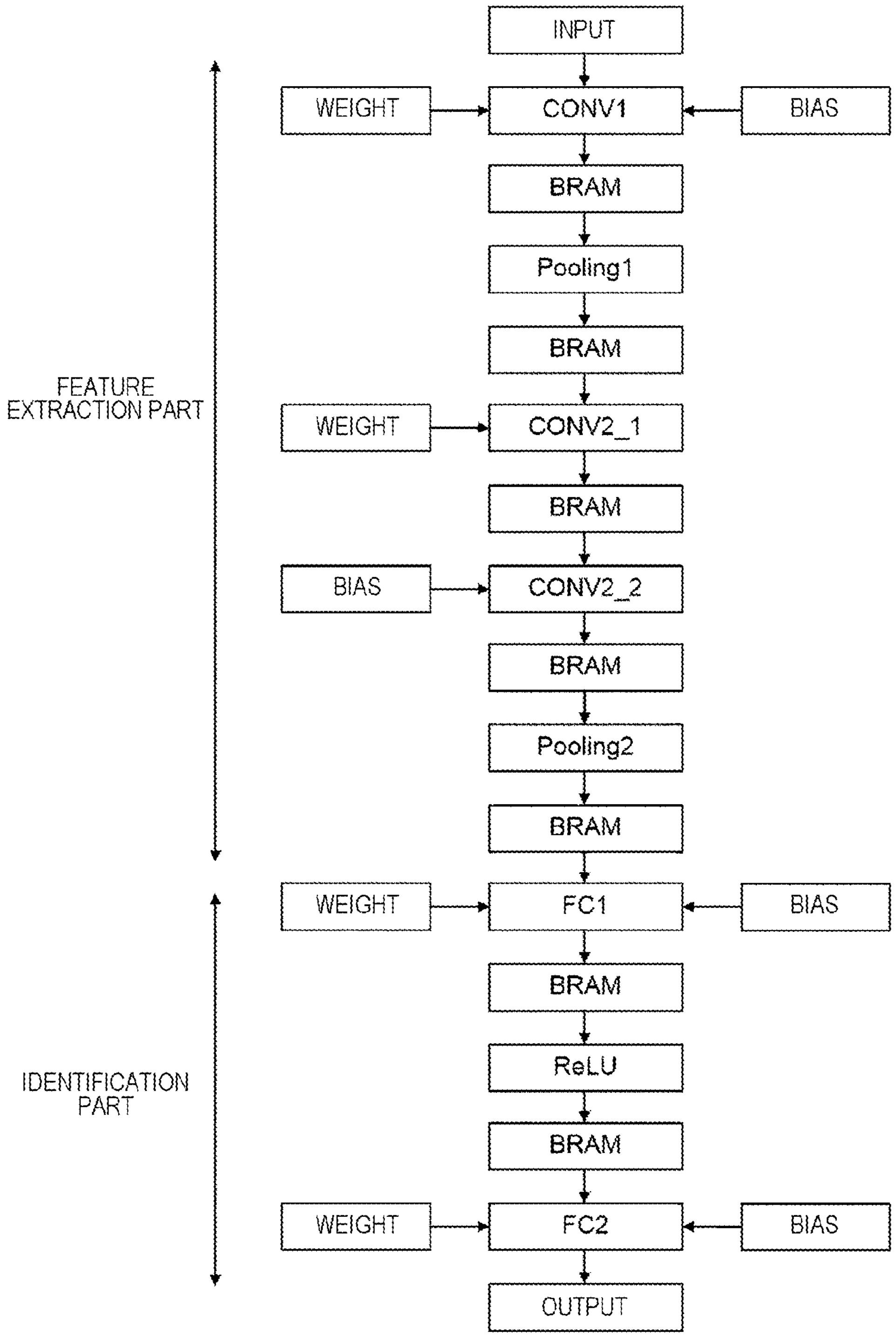
FIG. 2 is a diagram illustrating an example of a CNN in a reference example.

FIG. 2 is a diagram illustrating an example of a CNN in a reference example. In the CNN, convolution layers (CONV1, CONV2_1, and CONV2_2) and pooling layers (Pooling1 and Pooling2) that performs "pooling" processing of downsizing a result of convolution processing are alternately arranged. The convolution layer convolves a predetermined filter with respect to the input image. Furthermore, the CNN includes a "feature extraction part" that creates a feature map and an "identification part" that identifies an object included in an image input from the feature map by a plurality of fully connected layers (FC: FC1 and FC2). In the feature extraction part, an operation of convolving a filter with respect to an image is performed. Furthermore, in the identification part, a product-sum operation of multiplying the value of each pixel of the feature map by a weight to obtain a sum, and an operation of adding a bias to the result of the product-sum operation and inputting the result to an activation function to obtain an output thereof are repeated. Note that a rectified linear unit (ReLU) or the like is used as the activation function. The values of the weight and the parameter of the activation function can be determined by learning. In FIG. 2, "BRAM" represents a block RAM that stores a calculation result in each layer.

The detection calculation unit 101 performs a convolution operation and combination processing of the inference processing using an object detection algorithm based on deep learning, and outputs metadata included in the input image. The object detection algorithm is, for example, YOLO (Non Patent Literature 1) or SSD (Non Patent Literature 2).

The data handled in each layer of the multilayer neural network by the detection calculation unit 101 of the reference example, such as, for example, input, output (feature map), weight (kernel), bias, and the like is fixed-length data having a bit width smaller than 32 bits. The fixed-length data has a data structure capable of having different fixed-point positions for each layer. More specifically, in the reference example, the detection calculation unit 101 performs calculation processing corresponding to each of a plurality of layers constituting the multilayer neural network for fixed-length data having a bit width of 8 bits, for example, and the fixed-point position of data to be handled is set for each layer by the fixed-point position control unit 102, which will be described later.

Figure 3:
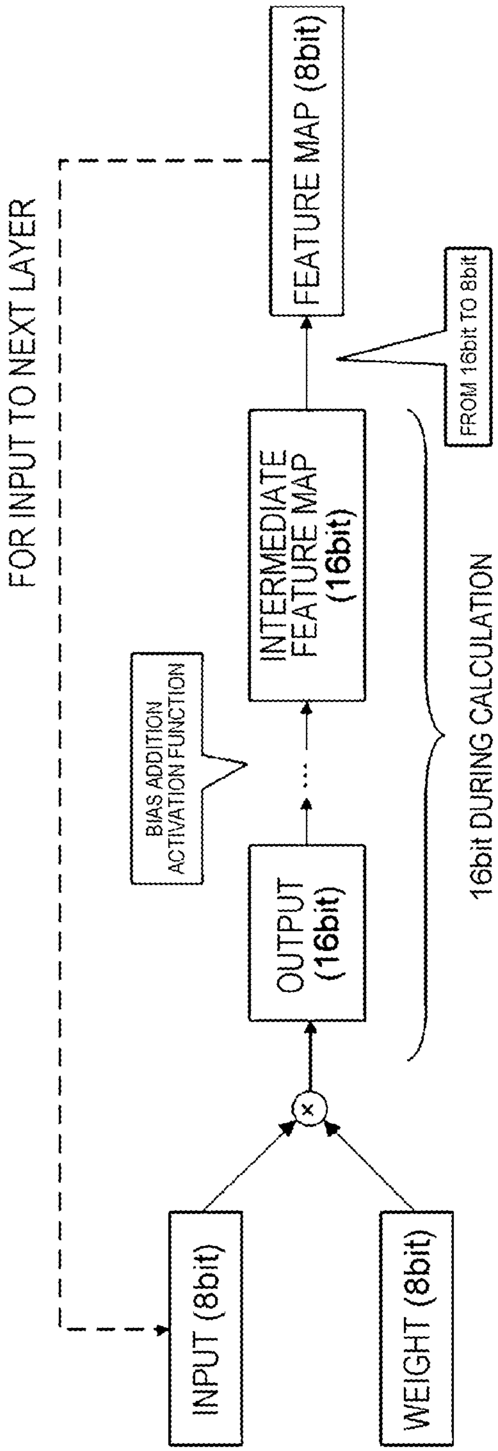
FIG. 3 is a diagram illustrating a flow of a convolution operation in a detection calculation unit of a reference example.

FIG. 3 illustrates a flow of a convolution operation in the detection calculation unit 101. For example, in a case where the input is 8 bits and the weight is 8 bits, the result obtained by the product-sum operation is 16 bits at the maximum. The detection calculation unit 101 adds a bias to the 16 bit calculation result and applies an activation function to obtain a 16 bit intermediate feature map. Since the feature map is an input in the next layer, the 16 bit intermediate input map is reduced to a width of 8 bits to obtain a feature map for input to the next layer. Note that the number of layers, the activation function, and the bias addition method are appropriately selected for each object detection algorithm to be used, and the technique of the reference example is not limited.

[Fixed-Point Position Control Unit]

As described above, the fixed-point position control unit 102 is a processing circuit that determines the fixed-point position of the fixed-length data to be calculated in the detection calculation unit 101, corresponding to each of the plurality of layers constituting the multilayer neural network.

In the reference example, the fixed-point position control unit 102 updates the fixed-point position of each layer on the basis of the value of the counter unit 103 and notifies the detection calculation unit 101 of the updated fixed-point position. The detection calculation unit 101 changes the fixed-point position of each layer on the basis of the notification. By using the counter unit 103, it is possible to optimize a plurality of layers at a time.

[Outline of Fixed-Point Position Control Flow]

Figure 4:
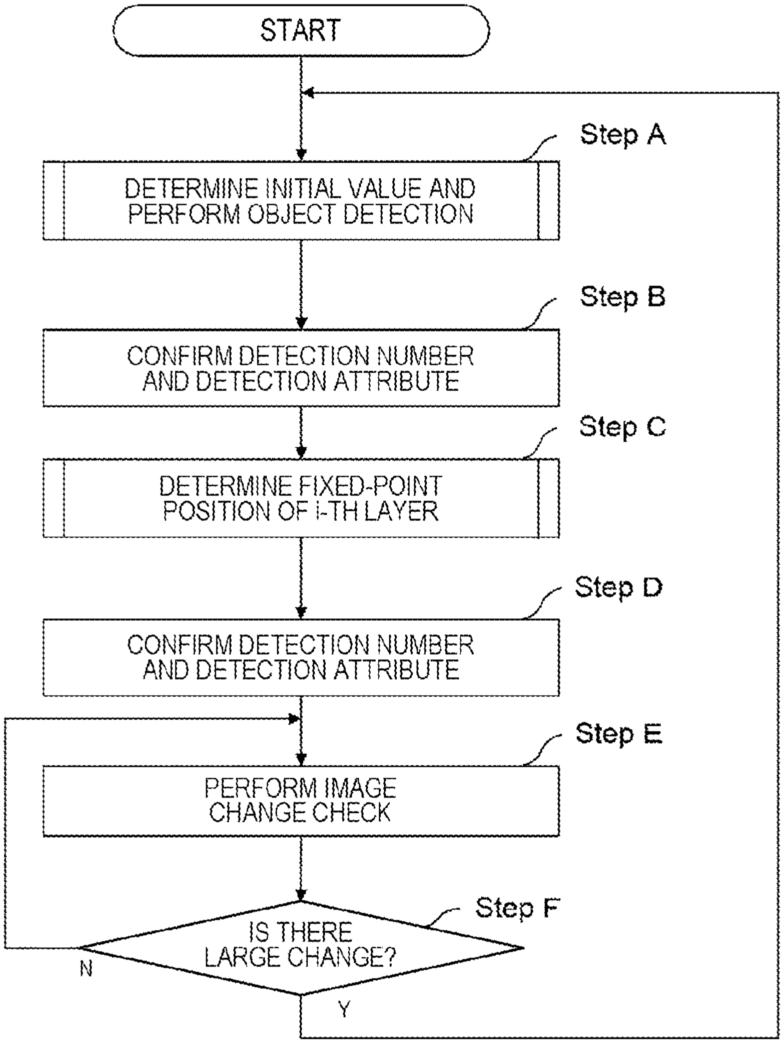
FIG. 4 is a diagram illustrating a routine of a fixed-point position control flow of a fixed-point position control unit of a reference example.

The operation of the object detection device 10 will be described by the fixed-point position control flow of the fixed-point position control unit 102. FIG. 4 is a diagram illustrating a routine of a fixed-point position control flow of the fixed-point position control unit 102. The fixed-point position control flow in FIG. 4 is a basic flow, and each subroutine will be described later. In the following description, the fixed-point position of the fixed-length data set corresponding to the i-th layer may be simply referred to as "the fixed-point position of the i-th layer" (where i is an integer of i>0).

In the flow of FIG. 4, the processing of determining the optimum fixed-point position is roughly divided into two steps (Step A and Step C), and after the fixed-point position is determined, processing of waiting until there is a large change in the image type or the like (Step E and Step F) is performed.

First, an initial value of a fixed-point position (initial fixed-point position nopt_first) is determined for each layer constituting the multilayer neural network, and object detection is performed using fixed-length data of the fixed-point position set on the basis of the initial value (Step A). Then, the detection attributes (Nobj) such as the total detection number (Nd) of objects obtained as a result of the object detection, "dog", and "human" are stored (Step B). Next, a fixed-point position (nopt_i, 0<i) of each layer is tuned to determine the optimum fixed-point position (Step C).

After tuning the fixed-point position of each layer, the detection calculation unit 101 is notified of the fixed-point position of each layer, the object detection processing is performed, and the obtained detection result (Nd, Nobj) is confirmed (Step D). Thereafter, the image change waiting state is entered (Step E, Step F), and if there is no large change in the image (Step F: NO), the image change check (Step E) is continued. In a case where there is a large change in the image (Step F: YES), the processing returns to Step A, and the optimization processing is restarted.

In the image change check (Step E), the image change is only required to be checked by either (A) determination processing using the total detection number Nd or (B) determination processing using the attribute (Nobj) of the detected object.

(A) In the determination processing using the total detection number Nd, the total detection number before and after moving the fixed-point position is compared. Note that the total detection number before moving the fixed-point position is the total detection number in Step B or Step D in FIG. 4. In the comparison, it is sufficient that, when the change rate is 0, it is identified that there is "no change", when the change rate of the total detection number is 0 or more and does not exceed the detection number threshold value, it is identified that there is "small change", and when the change rate of the total detection number exceeds the detection number threshold value, it is identified that there is "large change".

(B) In the determination processing using the attribute (Nobj) of the detected object, in a case where a new attribute is added, a ratio of the number of detected objects of the attribute Nobj to the total detection number Nd is determined, and "no change", "small change", or "large change" is identified.

Hereinafter, the processing of the determination of the initial fixed-point position (nopt_first) (Step A) and the processing of the determination of the fixed-point position in the i layer (nopt_i) (Step C) in the above-described fixed-point position control flow will be described in detail.

[Step A: Determination of Initial Fixed-Point Position (Nopt_First)]

Figure 5:
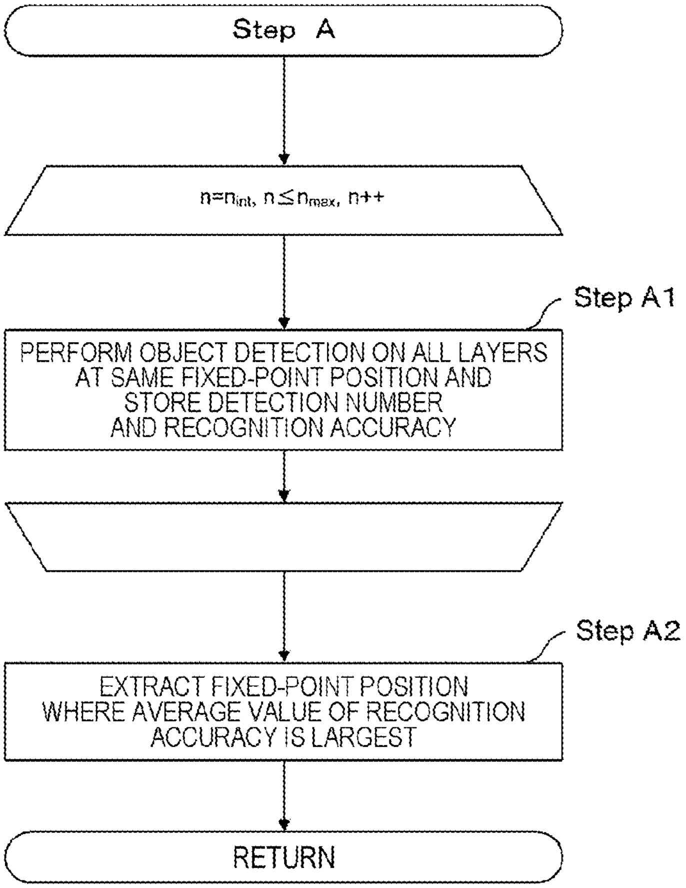
FIG. 5 is a diagram illustrating a flow as an example of processing for determining an initial fixed-point position of a reference example.

FIG. 5 illustrates a flow as an example of processing for determining an initial fixed-point position (nopt_first). In this determination method, the object detection is performed by making the value range and the minimum step width of the fixed-length data used in the calculation processing corresponding to each layer common by making the fixed-point positions of all the layers common while changing the fixed-point position. Then, the fixed-point position n with the best detection result is set as the initial fixed-point position nopt_first common to all layers.

Specifically, first, the object detection is performed for each input image while sequentially changing the fixed-point positions n of all the layers from an initial value ninit to a maximum value nmax, and the total detection number Nd and recognition accuracy A are stored for each fixed-point position (Step A1). Then, the recognition accuracy A per detected object, that is, the average value (ΣA/Nd) of the recognition accuracy A is obtained from the total detection number Nd and the recognition accuracy A obtained for each fixed-point position. Then, the fixed-point position n where the average value of the recognition accuracy A is largest is set as the initial fixed-point position nopt_first (Step A2). The initial value ninit and the maximum value nmax are determined by the designer of the device, and do not limit the technique of the reference example.

In addition, as an example of the method of determining the initial fixed-point position (nopt_first), the method of determining the initial value using a plurality of input images has been described, but the method is not limited thereto in the reference example. For example, a value range of a feature map that is an output result may be analyzed in advance for a plurality of images using an object detection simulator or the like, and the value range may be determined on the basis of the analysis result. In the reference example, the definition of "the fixed-point position with the best detection result" is "the position of the decimal point where the average value of the recognition accuracy is largest", but the present disclosure is not limited thereto. For example, "the fixed-point position where the detection number is largest" may be "the fixed-point position with best detection result".

[Step C: Determination of Fixed-Point Position (Nopt_i) of i Layer]

Figure 6:
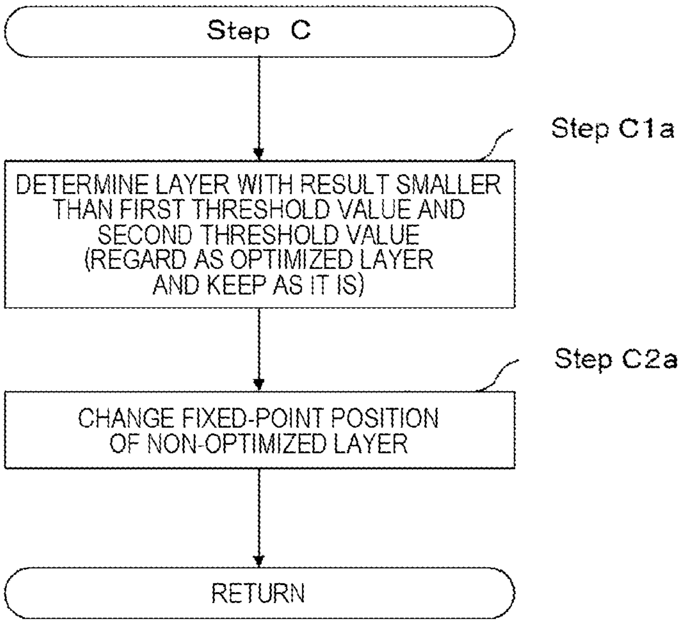
FIG. 6 illustrates a flow as an example of processing for determining a fixed-point position of each layer using a counter of a reference example.

FIG. 6 illustrates a flow as an example of processing for determining a fixed-point position (nopt_i) of each layer using the counter unit 103. Here, the values of the counter unit 103 are an upper limit counter value and a lower limit counter value. The upper limit counter value is the number of times the fixed-length data handled in each layer exceeds the upper limit value (a value of 1:00 for all bit strings) of the value range determined by the fixed-point position of the layer. In addition, the lower limit counter value is the number of times the fixed-length data handled in each layer falls below the lower limit value (a value of 1:00 for only the least significant bit (LSB) among all bit strings) of the value range determined by the fixed-point position of the layer.

In Step C, first, a layer in which the upper limit counter value and the lower limit counter value are smaller than a first threshold value UPth and a second threshold value UNth (UPth≥0, UNth≥0), respectively, as a result of performing the object detection as the initial value ninit, is determined. This layer is regarded as a "layer in which the fixed-point position is optimized", the fixed-point position of the layer is not changed and is kept as it is, and fixed-point position control is performed on layers other than the layer in the next Step C2a (Step C1a).

At this time, the threshold values UPth and UNth (≥0) are numerical values that can be set for each layer. In Step C2a of FIG. 6, the fixed-point position of the "non-optimized layer" is changed. Specifically, the upper limit counter value and the lower limit counter value of these layers are made to fall within the above-described conditions. That is, the fixed-point position of the non-optimized layer is changed every time the image is input such that the upper limit counter value becomes less than the first threshold value UPth and the lower limit counter value becomes less than the second threshold value UNth.

For example, first, focusing on the upper limit value, the fixed-point position is changed such that the upper limit counter value becomes smaller than the first threshold value UPth. The upper limit value is a value exceeding the first threshold value UPth, and the lower limit value is a value exceeding the second threshold value UNth. After the upper limit counter value is optimized, the lower limit counter value is changed to be smaller than the second threshold value UNth. When the upper limit counter value and the lower limit counter value converge, the fixed-point position is set as the optimum position nopt_i, and the process proceeds to Step D illustrated in FIG. 4. As a result of the control on the basis of the upper limit counter value and the lower limit counter value, which condition (whether to be smaller than UPth or smaller than UNth) is to be prioritized is determined in advance for each layer for a layer that is not more than any threshold value, and a case where the priority condition is satisfied is defined as the "optimized fixed-point position".

In addition, the fixed-point position may be changed by combining the value of the counter unit 103 and a method using the metadata using the metadata output from the detection calculation unit 101. In the case of detecting an object in a video, an object in a continuously input image changes little by little, and it is rare that all the objects change in a short time. Therefore, in the method using the metadata, instead of controlling the fixed-point position of each layer from the detection result of only one input image, the processing of calculating the fixed-point position of each layer using the result (metadata) of the object detection for the plurality of input images is repeated. Accordingly, the fixed-point position for each layer can be optimized little by little.

In a case where the counter unit 103 and the metadata are combined, the detection result (A, Nd) obtained in the process of optimizing the fixed-point position is stored by the value of the counter unit 103, and the fixed-point position giving the best result may be selected from the stored results. The above is the description of the reference example.

Outline of Embodiment of Present Disclosure

The method of the embodiment of the present disclosure is a method made to solve the problems in Non Patent Literature 4 and Reference Example. An object thereof is to implement low power while maintaining recognition accuracy by using n bits as data to be used for calculation in order to achieve miniaturization of a circuit and controlling fixed-point positions for each layer and each image.

Therefore, in the present disclosure, attention is paid to the point that when the calculation result exceeds the maximum value (that is, the upper limit saturation occurs) or falls below the minimum value (that is, the lower limit saturation occurs), the result of exceeding and the result of falling below all become equivalence data as the maximum value and the minimum value. If saturation can be intentionally generated, the equivalence rate of the calculation result becomes high. The equivalence rate is a ratio of equal results to the total number of pixels. In addition, the lower limit value with a small absolute value of the calculation result is used to improve the equivalence rate of the feature map (output from the previous layer) by increasing the lower limit saturation rate using the point that does not greatly affect the recognition accuracy, and the calculation skip is executed. The lower limit saturation rate is a ratio of data whose lower limit value is saturated (exceeding a lower limit threshold value) among data of the feature map to be calculated. Therefore, the lower limit saturation rate is proportional to the magnitude of the lower limit counter value to be counted. That is, by increasing the lower limit saturation rate, the equivalence rate can be increased. The equivalence rate is a rate at which the calculated product-sum operation result becomes the equivalence data. In addition, the power reduction is achieved by stopping the clock of the circuit during the calculation skip execution. Furthermore, although the recognition accuracy may deteriorate due to the improvement of the equivalence rate, processing of replacing the result of the recognition accuracy with the result of the recognition accuracy before the lower limit saturation rate is increased is performed in order to compensate for the deterioration.

As described above, the equivalence rate of the feature map is increased while the deterioration of the recognition accuracy is suppressed, and the power reduction is achieved by the calculation skip. In addition, when the equivalence rate of the feature map is increased, it is possible to use a calculation result calculated once without performing a calculation again for a portion where the same value continues, and thus it is also possible to improve an average calculation speed.

First Embodiment of Present Disclosure

The configuration and operation of a first embodiment of the present disclosure will be described below based on the reference example. Note that a processing unit having the same name as the processing unit of the reference example can perform similar processing, and the description thereof will be omitted.

Figure 7:
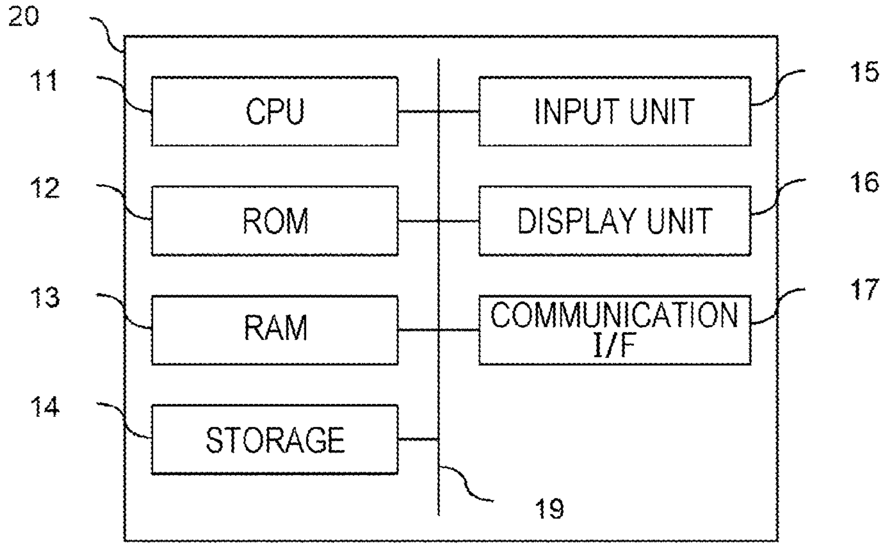
FIG. 7 is a block diagram illustrating a hardware configuration of an object detection device according to each embodiment of the present disclosure.

FIG. 7 is a block diagram illustrating a hardware configuration of an object detection device 20 according to each embodiment of the present disclosure. The object detection device 20 is an example of a data processing device of the technique of the present disclosure.

As illustrated in FIG. 7, the object detection device 20 includes a central processing unit (CPU) 11, a read only memory (ROM) 12, a random access memory (RAM) 13, a storage 14, an input unit 15, a display unit 16, and a communication interface (I/F) 17. The components are communicatively connected to each other via a bus 19.

The CPU 11 is a central processing unit, and executes various programs and controls each unit. That is, the CPU 11 reads the programs from the ROM 12 or the storage 14 and executes the programs by using the RAM 13 as a work area. The CPU 11 controls each component described above and performs various types of calculation processing according to the programs stored in the ROM 12 or the storage 14. In the present embodiment, the ROM 12 or the storage 14 stores an object detection program for executing various processes of the object detection device 20. The object detection program is an example of a data processing program of the technique of the present disclosure.

The ROM 12 stores various programs and various types of data. The RAM 13 temporarily stores programs or data as a work area. The storage 14 includes a storage device such as a hard disk drive (HDD) or solid state drive (SSD) and stores various programs including an operating system and various types of data.

The input unit 15 includes a pointing device such as a mouse and a keyboard and is used to perform various inputs.

The display unit 16 is, for example, a liquid crystal display and displays various types of information. The display unit 16 may function as the input unit 15 by employing a touch panel system.

The communication interface 17 is an interface for communicating with another device such as a terminal. For the communication, for example, a wired communication standard such as Ethernet (registered trademark) or FDDI or a wireless communication standard such as 4G, 5G, or Wi-Fi (registered trademark) is used.

Figure 8:
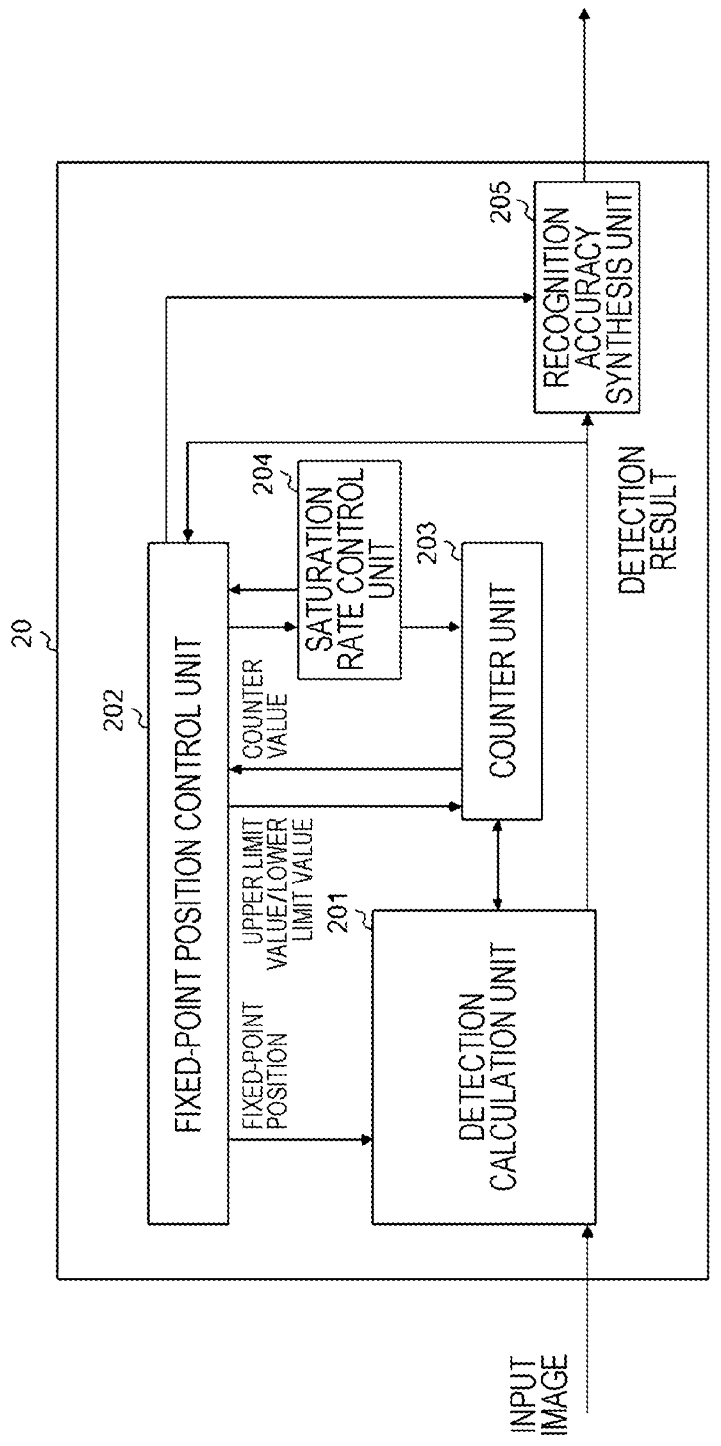
FIG. 8 is a block diagram illustrating a configuration of the object detection device according to each embodiment of the present disclosure.

Next, each functional configuration of the object detection device 20 will be described. FIG. 8 is a block diagram illustrating a configuration of the object detection device 20 according to each embodiment of the present disclosure. Each functional configuration is achieved by the CPU 11 reading an object detection program stored in the ROM 12 or the storage 14, loading the object detection program in the RAM 13, and executing the object detection program.

As illustrated in FIG. 8, the object detection device 20 includes a detection calculation unit 201, a fixed-point position control unit 202, a counter unit 203, a saturation rate control unit 204, and a recognition accuracy synthesis unit 205. Note that, since the detection calculation unit 201 executes many product-sum operations, it is often implemented by using a multi-core CPU or a graphics processing unit (GPU). Note that the detection calculation unit 201 may be implemented by, for example, a field programmable gate array (FPGA).

The detection calculation unit 201 is a calculation processing circuit capable of performing calculation processing similar to that of the detection calculation unit 101 of the reference example. The detection calculation unit 201 determines the equivalence data that increases according to the saturation rate of the image at the processing point in time in the calculation processing, and skips the second and subsequent calculation processing of the equivalence data. By performing the calculation skip in this manner, the processing of the detection calculation unit 201 considers the equivalence rate. In addition, in the calculation processing, metadata (detection result) including the number of detected objects in the image at the processing point in time, a frame surrounding the object, an attribute, and recognition accuracy of the attribute is detected. The metadata is used in processing of optimizing a lower limit saturation rate using the saturation rate control unit 204, which will be described later.

Figure 9:
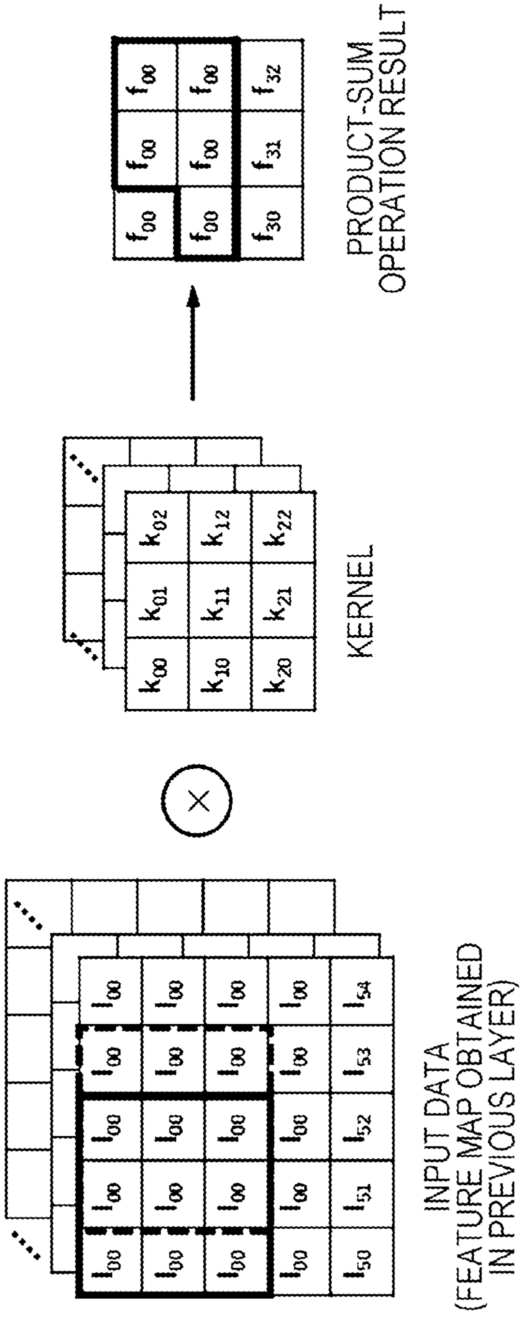
FIG. 9 is a diagram illustrating an example in which product-sum operation processing for one channel is performed by shifting kernel data by one stride in a detection calculation unit according to an embodiment of the present disclosure.

In the detection calculation unit 201, in addition to the basic convolution operation illustrated in the reference example, calculation skipping in units of kernel sizes and clock gating during skipping are performed. FIG. 9 illustrates an example in which product-sum operation processing for one channel is performed by shifting 5×5 input data and 3×3 kernel data by one stride. Shifting by one slide means sliding the kernel size by one unit. In addition, the input data is a feature map of the output obtained in the previous layer. An area surrounded by an input value thick frame in FIG. 9 is a first input value, and an area surrounded by an input value dotted thick frame is a second input value. The calculation skip in units of kernel sizes is a skip of calculation that can be performed in units of kernel sizes in a case where all the first input values corresponding to the size of the 3×3 kernel are the same value and all the second input values to be the next calculation target shifted by one stride are also the same value. FIG. 9 illustrates that, if the first calculation result is stored, the second calculation can be skipped by using the stored value. First, the presence or absence of the same value is determined in units of kernel sizes, and when all the values are the same value, the product-sum operation is performed, and the value is stored. Next, when the kernel is shifted, it is determined whether or not all the shifted values are the same value, and in a case where the values are the same value, the held calculation result is used, and the clock is stopped during that time to reduce the power. For example, when the product-sum operation for one channel is performed on the 5×5 input data and the 3×3 kernel data illustrated in FIG. 9 in one stride, all of the input data up to the fourth row have the same value (I00). Therefore, f00 (=I00×(k00+k01+k02+k10+k11+k12+k20+k21+k22)), which is the first calculation result, has the same value up to the second row of the product-sum operation result. In this example, the second to sixth calculations except the first calculation can be skipped out of the total of six calculations up to the second row. Note that the number of layers, the activation function, and the bias addition method are different for each object detection algorithm to be used, and are not defined in the present disclosure.

The fixed-point position control unit 202 and the saturation rate control unit 204 perform control in cooperation. The processing of optimizing the lower limit saturation rate by cooperation will be described in detail in the description of the operation, and only the functional configuration will be described here.

The fixed-point position control unit 202 performs first control to determine the fixed-point position and perform the calculation processing by the same processing as the reference example (processing of the 1st step to be described later). As the first control, the fixed-point position control unit 202 determines the fixed-point position obtained by moving the fixed-point position for each layer such that the upper limit counter value falls within the range of the first threshold value and the lower limit counter value falls within the range of the second threshold value. Then, as the first control, calculation processing is performed on the image at the processing point in time by the detection calculation unit 201.

In addition, the fixed-point position control unit 202 optimizes the lower limit saturation rate by repeatedly performing second control (processing of the 2nd step to be described later). The fixed-point position control unit 202 performs a predetermined determination on the basis of the instruction from the saturation rate control unit 204 and the metadata, determines the fixed-point position to which the fixed-point position for each layer is moved, and causes the detection calculation unit 201 to perform calculation processing on the image at the processing point in time.

The counter unit 203 has a functional configuration similar to that of the counter unit 103 of the reference example. The counter unit 203 counts an upper limit counter value that is the number of times the upper limit value of the value range determined by the fixed-point position is exceeded and a lower limit counter value that is the number of times the lower limit value of the value range is exceeded in the process of the calculation processing for each layer of the detection calculation unit 201.

The saturation rate control unit 204 operates in accordance with an instruction from the fixed-point position control unit 202. The instruction here may be to receive the result of the first control. The saturation rate control unit 204 performs control to increase the lower limit saturation rate with respect to the result of the first control. As the control, an instruction to move at least the fixed-point position is given to the fixed-point position control unit 202, and specific contents of the control will be described in terms of operation.

The recognition accuracy synthesis unit 205 replaces the recognition accuracy in the second control obtained by the calculation processing of the detection calculation unit 201 with the stored recognition accuracy in the first control with higher accuracy according to the determination of the fixed-point position control unit 202, and outputs the result as a detection result.

Figure 10:
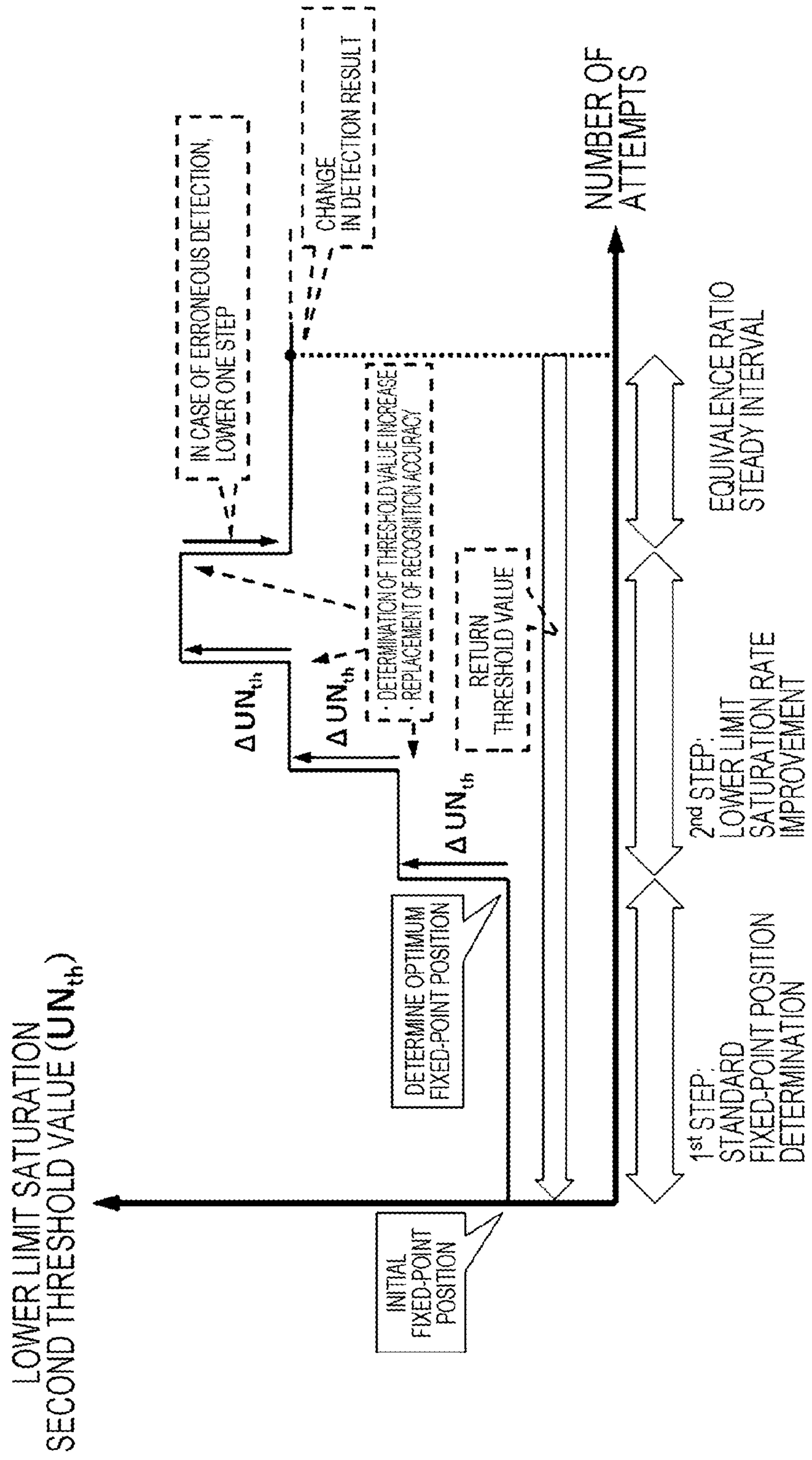
FIG. 10 is a diagram illustrating an outline of a control method for optimizing a lower limit saturation rate in a first embodiment.

Before describing the operation, a control method for optimizing the lower limit saturation rate will be described. FIG. 10 is a diagram illustrating an outline of a control method for optimizing the lower limit saturation rate in the first embodiment. The control flow is roughly divided into two steps, and in the 1st step, first, an appropriate fixed-point position is determined for each layer using a threshold (standard fixed-point position determination). In the 2nd step, the second threshold value of the lower limit is gradually increased by ΔUNth such that the lower limit saturation rate increases from the fixed-point position determined in the 1st step (lower limit saturation rate improvement). Accordingly, the lower limit saturation rate is increased as much as possible, and the fixed-point position where the maximum saturation rate is obtained is operated as a steady state (equivalence rate steady interval). Then, in a case where a change occurs in the detection result, the process returns to the 1st step.

Next, operation of the object detection device 20 will be described. The operation of the object detection device 20 of the present embodiment will be described by the fixed-point position control flow of the fixed-point position control unit 202 similarly to the reference example. The fixed-point position control flow processing is performed by the CPU 11 reading the object detection program from the ROM 12 or the storage 14, loading the object detection program in the RAM 13, and executing the object detection program. The fixed-point position control flow in the operation is an example of a data processing method of the technique of the present disclosure.

[Fixed-Point Position Control Flow of First Embodiment]

Figure 11:
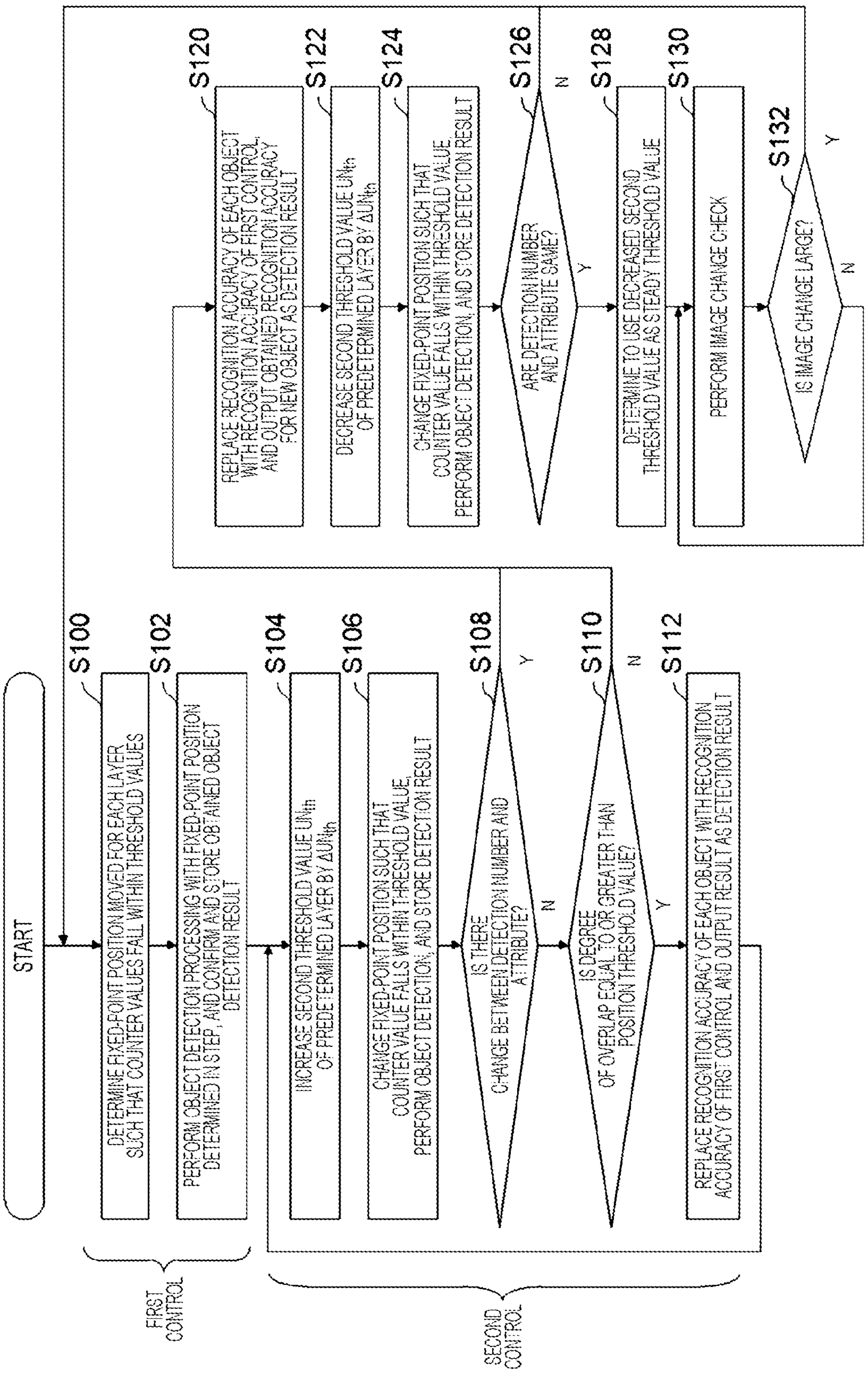
FIG. 11 is a diagram illustrating a routine of a fixed-point position control flow (lower limit saturation value control flow) of a fixed-point position control unit of the first embodiment.

FIG. 11 is a diagram illustrating a routine of a fixed-point position control flow (lower limit saturation value control flow) of the fixed-point position control unit 202 of the first embodiment. Note that the processing in Steps S100 and S102 is an example of a first control of the technique of the present disclosure, and the processing in the following steps is an example of second control of the technique of the present disclosure. In the fixed-point position control flow, the part of the second control is the lower limit saturation value control flow. Note that, hereinafter, reference numerals attached to terms such as the first threshold value and the second threshold value will be described only when necessary, and will be omitted as appropriate.

In Step S100, the CPU 11 determines the fixed-point position moved for each layer such that the upper limit counter value falls within the range of the first threshold value and the lower limit counter value falls within the range of the second threshold value. The processing of this step is executed by cooperation of the fixed-point position control unit 202 and the counter unit 203. Note that the processing of this step can be implemented by processing similar to the processing from Step A to Step C in the reference example. Processing of the present embodiment corresponding to Step C of the reference example will be described below.

The upper limit counter value and the lower limit counter value are counter values obtained by measuring the number of times the calculation result of each layer deviates from the absolute value of the value range determined by the data bit width and the fixed-point position. When these counter values increase, the upper limit value or the lower limit value, or the numerical value rounded to 0 increases, and the recognition accuracy decreases. Although the fixed-point position is moved to reduce these counter values, the data bit width is limited, and thus it is difficult to set the counter value=0 in all layers even if the fixed-point position is changed. Therefore, an initial first threshold value UPth_first and a second threshold value UNth_first are provided for each layer, and the fixed-point position is controlled such that the counter value falls within the threshold value, whereby the object detection can be performed without deteriorating the recognition accuracy.

The upper limit counter value and the lower limit counter value obtained by the object detection are compared with the set first threshold value and second threshold value, respectively, and the fixed-point position is changed for each layer as in the following (A) to (C) to determine the standard fixed-point position.

(A) In a case where the upper limit counter value<the first threshold value UPth_first and the lower limit counter value<the second threshold value UNth_first, the fixed-point position is not changed and is kept as it is. (B) In a case where the upper limit counter value≥the first threshold value UPth_first, the fixed-point position is moved by one to the LSB side. (C) In a case where the upper limit counter value=0 and the lower limit counter value≥UNth_first, the fixed-point position is moved by one to the most significant bit (MSB) side. This operation is repeated for a plurality of images, and the fixed-point position is changed such that the upper limit counter value falls within the first threshold value and the lower limit counter value falls within the second threshold value. For a layer that does not fall within the threshold value, control is performed such that the upper limit counter value falls within the first threshold value.

In Step S102, the CPU 11 performs the object detection processing with the fixed-point position determined in step, and confirms and stores the detection number Nd, the attribute Nobj, the frame indicating the position of the object, and the recognition accuracy as the obtained detection result.

Next, as the 2nd step, the lower limit saturation rate is increased within a range in which the number of detected objects is not changed.

In Step S104, the CPU 11, as the fixed-point position control unit 202, instructs the saturation rate control unit 204 to increase the second threshold value UNth of the predetermined layer by ΔUNth (UNth=UNth+ΔUNth). Here, the predetermined layer is all layers, but may be a designated layer determined in advance.

In Step S106, after increasing the second threshold value UNth, the CPU 11 changes the fixed-point position such that the counter value falls within the threshold value, and performs object detection. Here, the object detection is performed twice using the two input images, and the fixed-point position is changed in the object detection for each image as follows. (1): Fixed-point positions of all layers are moved to the LSB side by one, and object detection is performed. The movement to the LSB side is a direction of increasing the lower limit saturation rate. (2): The layer in which the lower limit counter value obtained as a result of the detection in (1) is larger than the second threshold value UNth is moved to the MSB side by one and returned to the original state, and object detection is performed. Note that the detection number Nd, the attribute Nobj, the frame indicating the position of the object, and the recognition accuracy obtained as the detection result are stored. The processing of this step is executed by cooperation of the fixed-point position control unit 202 and the detection calculation unit 201.

In Step S108, the CPU 11 compares the detection number and the attributes in the detection result in Step S106 in the above (2) with those stored in Step S102, and determines whether or not there is a change. When there is no change, the process proceeds to Step S110, and when there is a change, the process proceeds to Step S120.

In Step S110, the CPU 11 determines whether or not the degree of area overlap between the frame indicating the position of the object obtained in Step S102 and the frame indicating the position of the object obtained in Step S106 is equal to or greater than the position threshold value. Note that the degree of overlap indicates an area that overlaps when frames indicating the positions of objects obtained in each of the two times of object detection are overlapped. When the degree of overlap is equal to or greater than the position threshold value, it is determined that the second threshold value has been increased within a range in which there is no image change and no erroneous detection occurs, and the process proceeds to Step S112. In a case where the degree of overlap is not equal to or greater than the position threshold, it is determined that there is an image change, and the process proceeds to Step SS120.

In Step S112, the CPU 11 replaces the recognition accuracy of each object with the recognition accuracy of the first control (Step S102) and outputs the result as a detection result. This processing is executed by the fixed-point position control unit 202 issuing an instruction to the recognition accuracy synthesis unit 205 to replace the accuracy. After completion of this step, the process returns to Step S104, and this is repeated until the detection number and the attribute change. Accordingly, the processing of improving the lower limit saturation rate illustrated in FIG. 10 is performed.

In Step S120, the CPU 11 replaces the recognition accuracy of each object with the recognition accuracy of the first control (Step S102), and outputs the obtained recognition accuracy for the new object as a detection result. In this way, the recognition accuracy for the object being continuously detected is maintained.

In Step S122, the CPU 11, as the fixed-point position control unit 202, instructs the saturation rate control unit 204 to decrease the second threshold value UNth of the predetermined layer by ΔUNth (UNth=UNth−UNth).

In Step S124, after decreasing the second threshold value UNth, the CPU 11 changes the fixed-point position such that the counter value falls within the threshold value, and performs object detection. The detection number Nd, the attribute Nobj, the frame indicating the position of the object, and the recognition accuracy obtained as the detection result are stored. The processing of this step is executed by cooperation of the fixed-point position control unit 202 and the detection calculation unit 201.

In Step S126, the CPU 11 compares the detection number and the attribute in Step S124 with those stored in Step S102, and determines whether or not the detection number and the attribute are the same. When the detection number and the attribute are the same, the process proceeds to Step S128, and when the detection number and the attribute are not the same, the process returns to Step S100. According to this determination, when the detection number and the attribute are the same, the determination result in the previous Step S108 is a change due to the occurrence of erroneous detection, and it can be determined that the recognition accuracy is maintained when the determination result is the second threshold value at the previous step.

In Step S128, the CPU 11 determines to use the second threshold value decreased in Step S122 as a steady threshold value. Accordingly, the object detection is performed by the steady threshold value, and as a result, the lower limit saturation rate in the object detection is improved and the equivalence rate is improved.

In Step S130, the CPU 11 performs an image change check. For example, the image change check may be determined based on the detection number and attributes similarly to the reference example. In addition, the present disclosure is not limited thereto, and for example, a timeout may be used to treat that the image has changed with the lapse of a certain period of time.

In Step S132, the CPU 11 returns to the process of Step S100 when the image change is large in the image change check, and repeats Step S130 and this step when the image change is not large. As described above, the lower limit saturation rate can be increased without deteriorating the recognition accuracy.

As described in the above operation, the saturation rate control unit 204 issues an instruction to increase the second threshold value UNth of the predetermined layer by ΔUNth (Step S104). In addition, the fixed-point position control unit 202 causes the detection calculation unit 201 to perform calculation processing on the basis of the second threshold value UNth increased by the instruction (Step S104), and performs a first determination of determining a change in the metadata in the calculation result with respect to the first control (Steps S106 to S110). When it is determined that there is no change, the second threshold value is repeatedly increased (Steps S104 to S112). When it is determined that there is a change in the first determination, the saturation rate control unit 204 issues an instruction to decrease the second threshold value of the predetermined layer (Steps S120 and S122). In addition, the fixed-point position control unit 202 causes the detection calculation unit 201 to perform calculation processing on the basis of the second threshold value UNth decreased by the instruction, and performs a second determination of determining a change in the metadata in the calculation result with respect to the first control (Step S124). When it is determined in the second determination that there is no change, the second threshold value is set as the steady threshold value, and when it is determined that there is a change, the process returns to the first control (Step S126).

As described above, according to the object detection device 20 of the present embodiment, it is possible to reduce the power consumption by skipping the calculation that can be performed by increasing the equivalence rate of the output.

Second Embodiment of Present Disclosure

A second embodiment is an aspect in which the lower limit saturation rate is improved by moving the fixed-point position without changing the second threshold value. The first embodiment is a method in which after the optimum fixed-point position is determined, the second threshold value is increased to increase the pixel data reaching saturation. In this case, since the fixed-point position is determined after the second threshold value is increased, it is necessary to use at least two input images. The difference between the second embodiment and the first embodiment is that the fixed-point position is directly changed instead of increasing the threshold value as a method of improving the equivalence rate in the 2nd step. In the second embodiment, a method of improving the equivalence rate in one input image will be described. Since the configuration of the second embodiment is similar to that of the first embodiment, the description thereof will be omitted, and only the difference in processing in the operation will be described.

Figure 12:
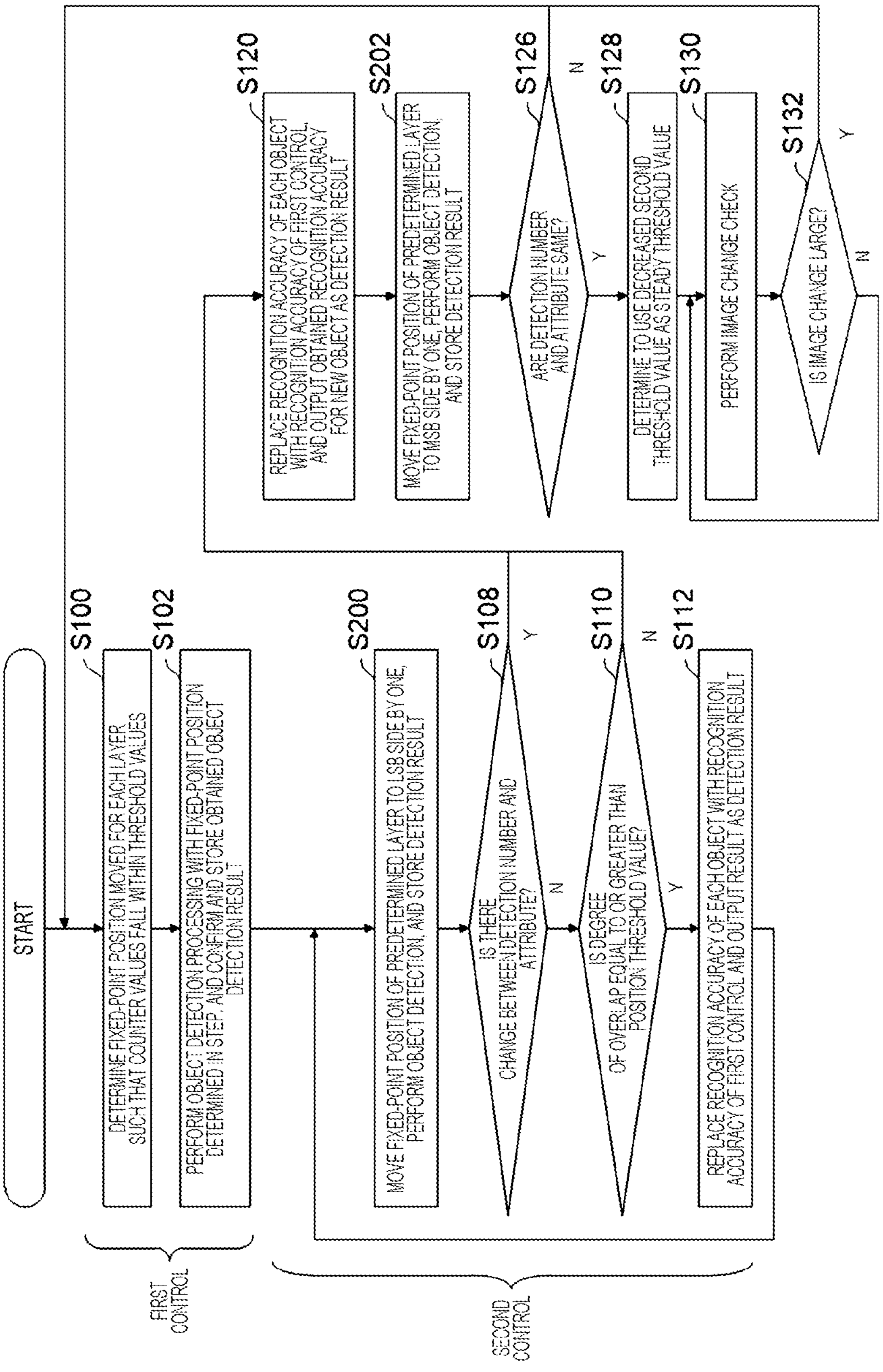
FIG. 12 is a diagram illustrating a routine of a fixed-point position control flow (lower limit saturation value control flow) of a fixed-point position control unit of a second embodiment.

FIG. 12 illustrates a fixed-point position control flow (lower limit saturation value control flow) according to the second embodiment. The difference from the first embodiment is that Steps S104 and S124 are not provided.

In the second embodiment, after Step S102, the process proceeds to Step S200. In Step S200, the CPU 11 moves the fixed-point position of the predetermined layer to the LSB side by one, performs object detection, and stores the detection result. After Step S200, the process proceeds to Step S108. After Step S120, the process proceeds to Step S202. In Step S202, the CPU 11 moves the fixed-point position of the predetermined layer to the MSB side by one, performs object detection, and stores the detection result. After Step S202, the process proceeds to Step S126. As described above, the saturation rate can be increased in a shorter time, and the average power at the time of observation for a long time can be reduced.

As described in the above operation, the saturation rate control unit 204 issues an instruction to move the fixed-point position of the predetermined layer to the least significant bit side by a bits (a>0) in the instruction (Step S200). In addition, the fixed-point position control unit 202 causes the detection calculation unit 201 to perform calculation processing using the moved fixed-point position moved to the lower bit side on the basis of the instruction (Step S200). A first determination is performed to determine a change in the metadata in the calculation result with respect to the first control (Steps S106 to S110). When it is determined that there is a change in the first determination, the saturation rate control unit 204 issues an instruction to move the fixed-point position of the predetermined layer to the most significant bit side by a bits (a>0) (Step S202). In addition, the fixed-point position control unit 202 causes the detection calculation unit 201 to perform calculation processing using the moved fixed-point position moved to the most significant bit side on the basis of the instruction, and performs a second determination of determining a change in the metadata in the calculation result with respect to the first control (Step S124). When it is determined in the second determination that there is no change, the second threshold value is set as the steady threshold value, and when it is determined that there is a change, the process returns to the first control (Step S126).

As described above, according to the object detection device 20 of the present embodiment, the process of improving the equivalence rate can be made efficient.

Third Embodiment of Present Disclosure

A third embodiment is an aspect in which the object detection at the optimum fixed-point position is performed every certain period even in the process of improving the equivalence rate, and the result is overwritten. In the first embodiment and the second embodiment, the recognition accuracy (Step S112) to be replaced while the equivalence rate is increased is the recognition accuracy when detection is performed at the fixed-point position determined in the first control. However, in this case, even if the number of objects to be actually detected increases in the image at the processing point in time in the process of increasing the equivalence rate, there may be objects that are not detected due to the increased equivalence rate. Therefore, in the present embodiment, even in the process of increasing the equivalence rate, the object detection at the optimum fixed-point position is performed every certain period, and the result is overwritten.

Figure 13:
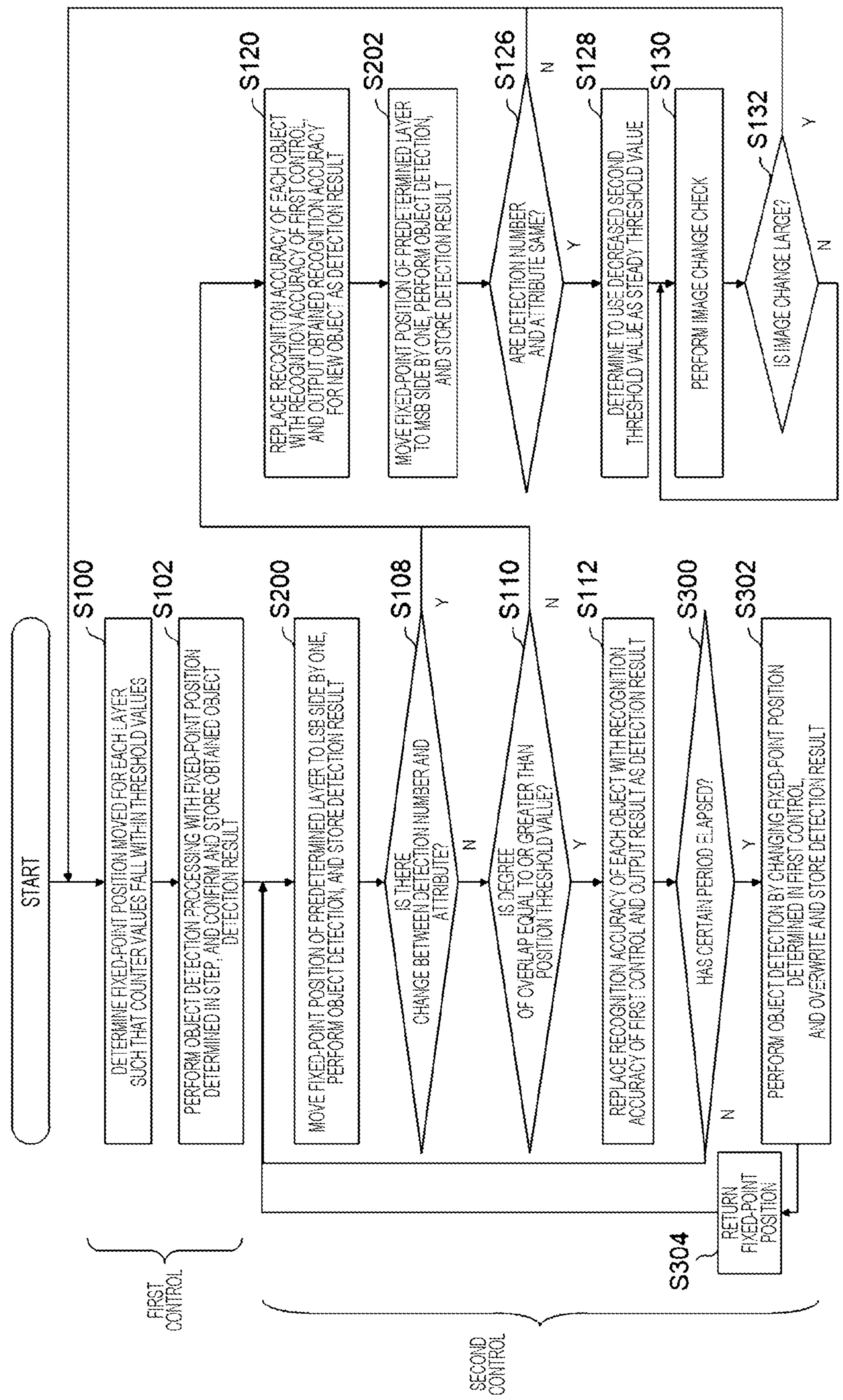
FIG. 13 is a diagram illustrating a routine of a fixed-point position control flow (lower limit saturation value control flow) of a fixed-point position control unit of a third embodiment.

FIG. 13 illustrates a fixed-point position control flow (lower limit saturation value control flow) according to the third embodiment. The difference from the second embodiment is that the process proceeds to Step S300 after Step S112.

In Step S300, it is determined whether or not a certain period has elapsed. In a case where the certain period has elapsed, the process proceeds to Step S302, and in a case where the certain period has not elapsed, the process returns to Step S104.

In Step S302, the CPU 11 performs the object detection by changing the fixed-point position used in Step S102, that is, the fixed-point position determined in the first control, and overwrites and stores the detection result. Accordingly, the detection result of Step S102 is updated.

In Step S304, the CPU 11 returns the fixed-point position to the fixed-point position when moved in Step S200, and returns to Step S200.

With the above operation, the fixed-point position control unit 202 determines whether or not the predetermined condition is satisfied after performing the predetermined determination (Step S300). The fixed-point position control unit 202 causes the detection calculation unit 201 to obtain the metadata again for the processing target data at the point in time of the calculation processing by using the fixed-point position determined in the first control. The recognition accuracy synthesis unit 205 overwrites the metadata obtained in the first control with the metadata obtained again (Step S302).

As described above, according to the object detection device 20 of the present embodiment, the object detection can be performed without lowering the accuracy even in the process of improving the equivalence rate.

The various processes, which are executed by the CPU reading software (program) in each embodiment described above, may be executed by various processors other than the CPU. Examples of the processors in this case include a programmable logic device (PLD) whose circuit configuration can be changed after manufacturing, such as an FPGA, and a dedicated electric circuit that is a processor having a circuit configuration exclusively designed for executing specific processing, such as an application specific integrated circuit (ASIC). Further, the various processes may be executed by one of the various processors or may be executed by a combination of two or more processors of the same type or different types (for example, a combination of a plurality of FPGAs or a combination of a CPU and an FPGA). Furthermore, a hardware structure of the various processors is, more specifically, an electric circuit in which circuit elements such as semiconductor elements are combined.

Further, in each embodiment described above, the aspect in which the object detection program is stored (installed) in advance in the storage 14 has been described, but the present disclosure is not limited thereto. The program may be provided by being stored in a non-transitory storage medium such as a compact disk read only memory (CD-ROM), a digital versatile disk read only memory (DVD-ROM), and a universal serial bus (USB) memory. The program may be downloaded from an external device via a network.

Regarding the above embodiment, the following supplementary notes are further disclosed.

(Supplementary Note 1)

A data processing device including:

a memory; and at least one processor connected to the memory, in which the processor is configured to:

set a fixed-point position of N-bit (N is a natural number of 2 or more) fixed-length data corresponding to each of a plurality of layers constituting a multilayer neural network, and set a fixed-point position of the fixed-length data;

perform calculation processing corresponding to each of the plurality of layers constituting the multilayer neural network for each of pieces of processing target data continuously input according to a processing algorithm of the multilayer neural network with respect to the N-bit fixed-length data in which the fixed-point position is set, determine equivalence data that increases according to a saturation rate of the processing target data at a processing point in time in the calculation processing, skip second and subsequent calculation processing of the equivalence data, and detect metadata including the number of detected objects in the processing target data at the processing point in time, a frame surrounding the objects, an attribute, and recognition accuracy of the attribute in the calculation processing;

count an upper limit counter value that is a number of times an upper limit value of a value range determined by the fixed-point position is exceeded and a lower limit counter value that is a number of times falling below a lower limit value of the value range occurs in a process of the calculation processing for each layer;

determine, as first control, a fixed-point position moved for each layer such that the upper limit counter value falls within a range of a first threshold value and the lower limit counter value falls within a range of a second threshold value, and perform calculation processing on the processing target data at the processing point in time;

issue, as second control to be repeated, an instruction to move at least the fixed-point position as control to increase a lower limit saturation rate proportional to a magnitude of the counted lower limit counter value with respect to a result of the first control;

perform, as the second control, a predetermined determination based on the instruction and the metadata, determine the fixed-point position moved for each layer, and perform calculation processing on the processing target data at the processing point in time; and replace, as the second control, the recognition accuracy obtained by the calculation processing with the stored recognition accuracy with higher accuracy.

(Supplementary Note 2)

A non-transitory storage medium storing a program executable by a computer to perform data processing including:

setting a fixed-point position of N-bit (N is a natural number of 2 or more) fixed-length data corresponding to each of a plurality of layers constituting a multilayer neural network, and setting a fixed-point position of the fixed-length data;

performing calculation processing corresponding to each of the plurality of layers constituting the multilayer neural network for each of pieces of processing target data continuously input according to a processing algorithm of the multilayer neural network with respect to the N-bit fixed-length data in which the fixed-point position is set, determining equivalence data that increases according to a saturation rate of the processing target data at a processing point in time in the calculation processing, skipping second and subsequent calculation processing of the equivalence data, and detecting metadata including the number of detected objects in the processing target data at the processing point in time, a frame surrounding the objects, an attribute, and recognition accuracy of the attribute in the calculation processing;

counting an upper limit counter value that is a number of times an upper limit value of a value range determined by the fixed-point position is exceeded and a lower limit counter value that is a number of times falling below a lower limit value of the value range occurs in a process of the calculation processing for each layer;

determining, as first control, a fixed-point position moved for each layer such that the upper limit counter value falls within a range of a first threshold value and the lower limit counter value falls within a range of a second threshold value, and performing calculation processing on the processing target data at the processing point in time;

issuing, as second control to be repeated, an instruction to move at least the fixed-point position as control to increase a lower limit saturation rate proportional to a magnitude of the counted lower limit counter value with respect to a result of the first control;

performing, as the second control, a predetermined determination based on the instruction and the metadata, determining the fixed-point position moved for each layer, and performing calculation processing on the processing target data at the processing point in time; and replacing, as the second control, the recognition accuracy obtained by the calculation processing with the stored recognition accuracy with higher accuracy.

The invention claimed is:

1. A data processing device comprising:

a memory; and at least one processor coupled to the memory, the at least one processor being configured to:

set a fixed-point position of N-bit (N is a natural number of 2 or more) fixed-length data corresponding to each of a plurality of layers constituting a multilayer neural network, and set a fixed-point position of the fixed-length data;

perform calculation processing corresponding to each of the plurality of layers constituting the multilayer neural network for each of pieces of processing target data continuously input according to a processing algorithm of the multilayer neural network with respect to the N-bit fixed-length data in which the fixed-point position is set, determine equivalence data that increases according to a saturation rate of the processing target data at a processing point in time in the calculation processing, skip second and subsequent calculation processing of the equivalence data by stopping a clock of a circuit to reduce electric power consumption by the circuit, and detect metadata including the number of detected objects in the processing target data at the processing point in time, a frame surrounding the objects, an attribute, and recognition accuracy of the attribute in the calculation processing;

count an upper limit counter value that is a number of times an upper limit value of a value range determined by the fixed-point position is exceeded and a lower limit counter value that is a number of times falling below a lower limit value of the value range occurs in a process of the calculation processing for each layer;

determine, as first control, a fixed-point position moved for each layer such that the upper limit counter value falls within a range of a first threshold value and the lower limit counter value falls within a range of a second threshold value, and perform calculation processing on the processing target data at the processing point in time, issue, as second control to be repeated, an instruction to move at least the fixed-point position as control to increase a lower limit saturation rate proportional to a magnitude of the counted lower limit counter value with respect to a result of the first control, perform, as the second control, a predetermined determination based on the instruction to move the at least the fixed-point position and the metadata as detected, determines the fixed-point position moved for each layer, and perform calculation processing on the processing target data at the processing point in time, and replace, as the second control, the recognition accuracy obtained by the calculation processing as performed with the stored recognition accuracy with higher accuracy to output a result of object recognition.

2. The data processing device according to claim 1, wherein the processor is configured to issue an instruction to increase the second threshold value of a predetermined layer in the instruction, repeatedly perform calculation processing based on the second threshold value increased by the instruction, performs a first determination of determining a change in the metadata with respect to the first control in a calculation result, and increases the second threshold value when it is determined that there is no change in the first determination, issue an instruction to decrease the second threshold value of a predetermined layer when it is determined that there is a change in the first determination, and perform calculation processing based on the second threshold value decreased by the instruction, performs a second determination of determining a change in the metadata with respect to the first control in a calculation result, sets the second threshold value as a steady threshold value when it is determined that there is no change in the second determination, and returns to the first control when it is determined that there is a change in the second determination.

3. The data processing device according to claim 1, wherein the processor is configured to issue an instruction to move the fixed-point position of a predetermined layer to a least significant bit side by a number of bits in the instruction, the number being greater than zero repeatedly perform calculation processing by using the moved fixed-point position moved to the least significant bit side based on the instruction, performs a first determination of determining a change of the metadata with respect to the first control in a calculation result, and moves to the least significant bit side when it is determined in the first determination that there is no change, issue an instruction to move the fixed-point position of a predetermined layer to a most significant bit side by the number of bits when it is determined that there is a change in the first determination, and perform calculation processing by using the moved fixed-point position moved to the most significant bit side based on the instruction, performs a second determination of determining a change in the metadata with respect to the first control in a calculation result, sets the second threshold value as a steady threshold value when it is determined that there is no change in the second determination, and returns to the first control when it is determined that there is a change in the second determination.

4. The data processing device according to claim 1, wherein the processor is configured to obtain the metadata again for the processing target data at the point in time of calculation processing by using the fixed-point position determined in the first control when a predetermined condition is satisfied after performing the predetermined determination, and overwrite the metadata obtained in the first control with the metadata obtained again.

5. The data processing device according to claim 1, wherein the processor is configured to stop a clock of the circuit while skipping the calculation processing.

6. A data processing method causing a computer to execute processing comprising:

setting a fixed-point position of N-bit (N is a natural number of 2 or more) fixed-length data corresponding to each of a plurality of layers constituting a multilayer neural network, and setting a fixed-point position of the fixed-length data;

performing calculation processing corresponding to each of the plurality of layers constituting the multilayer neural network for each of pieces of processing target data continuously input according to a processing algorithm of the multilayer neural network with respect to the N-bit fixed-length data in which the fixed-point position is set, determining equivalence data that increases according to a saturation rate of the processing target data at a processing point in time in the calculation processing, skipping second and subsequent calculation processing of the equivalence data by stopping a clock of a circuit to reduce electric power consumption by the circuit, and detecting metadata including the number of detected objects in the processing target data at the processing point in time, a frame surrounding the objects, an attribute, and recognition accuracy of the attribute in the calculation processing;

counting an upper limit counter value that is a number of times an upper limit value of a value range determined by the fixed-point position is exceeded and a lower limit counter value that is a number of times falling below a lower limit value of the value range occurs in a process of the calculation processing for each layer;

determining, as first control, a fixed-point position moved for each layer such that the upper limit counter value falls within a range of a first threshold value and the lower limit counter value falls within a range of a second threshold value, and performing calculation processing on the processing target data at the processing point in time;

issuing, as second control to be repeated, an instruction to move at least the fixed-point position as control to increase a lower limit saturation rate proportional to a magnitude of the counted lower limit counter value with respect to a result of the first control;

performing, as the second control, a predetermined determination based on the instruction to move the at least the fixed-point position and the metadata as detected, determining the fixed-point position moved for each layer, and performing calculation processing on the processing target data at the processing point in time; and replacing, as the second control, the recognition accuracy obtained by the calculation processing as performed with the stored recognition accuracy with higher accuracy to output a result of object recognition.

7. The data processing method according to claim 6, further comprising:

issuing an instruction to increase the second threshold value of a predetermined layer in the instruction;

repeatedly performing calculation processing based on the second threshold value increased by the instruction, performing a first determination of determining a change in the metadata with respect to the first control in a calculation result, and increasing the second threshold value when it is determined that there is no change in the first determination;

issuing an instruction to decrease the second threshold value of a predetermined layer when it is determined that there is a change in the first determination; and performing calculation processing based on the second threshold value decreased by the instruction, performing a second determination of determining a change in the metadata with respect to the first control in a calculation result, setting the second threshold value as a steady threshold value when it is determined that there is no change in the second determination, and returning to the first control when it is determined that there is a change in the second determination.

8. A non-transitory, computer-readable storage medium storing a data processing program for causing a computer to function as the data processing device according to claim 1.

* * * * *